United States Patent [19]
Mizobata et al.

[11] Patent Number: 6,115,434
[45] Date of Patent: Sep. 5, 2000

[54] DATA MATCH DETECTING APPARATUS, AND DATA SELECTING APPARATUS

[75] Inventors: Norihiko Mizobata, Habikino; Tomohiro Okuno, Suita; Wakahiko Okazaki, Hirakata; Kazuhisa Tanaka, Hirakata, all of Japan

[73] Assignee: Matsushita Electric Industrial Co., Ltd., Japan

[21] Appl. No.: 09/162,298

[22] Filed: Sep. 28, 1998

[30] Foreign Application Priority Data

Sep. 29, 1997 [JP] Japan ................................ 9-264246
Jun. 29, 1998 [JP] Japan ................................ 10-182499

[51] Int. Cl.⁷ .................................................. H04L 27/06
[52] U.S. Cl. ............................................................ 375/340
[58] Field of Search .................................... 375/340, 343, 375/368

[56] References Cited

U.S. PATENT DOCUMENTS 4,414,678  11/1983  Kraul et al. ............................ 375/368

*Primary Examiner*—Tesfaldet Bocure
*Attorney, Agent, or Firm*—Wall Marjama Bilinski & Burr

[57] ABSTRACT

A data match detecting apparatus which sequentially receives input data comprising plural fields, comprises parameter storage which contains a parameter group comprising plural parameters which are checked to detect a match between the plural fields and the plural parameters; parameter selector for selecting a parameter corresponding to a field input as the input data from the parameter storage and outputting the selected parameter; data comparator for checking match between the parameter output from the parameter selector and the input data; a comparison result storing circuit initialing its storage content to match before a first field of the input data for which match detection should be performed is input, storing a comparison result of a comparison result decider when there is an input field, and outputting its storage content when all the fields of the input data for which match detection should be performed have been input; and the comparison result decider storing match in the comparison result storage when the storage content of the comparison result storage and the comparison result of the data comparator are match.

11 Claims, 11 Drawing Sheets

DATA MATCH DETECTING APPARATUS, AND DATA SELECTING APPARATUS

FIELD OF THE INVENTION

The present invention relates to a data match detecting apparatus, a data selecting apparatus, and more particularly to an apparatus which checks whether or not there is match between (1) data to-be-received among data received by broadcasting or among digital data output from a recording device, and (2) candidate data. The present invention further relates to an apparatus which selects data which matches the candidate data.

BACKGROUND OF THE INVENTION

Recently, in many cases, video data, audio data or other data is transmitted and stored in digital form. In such cases, data is generally divided into packet data comprising plural fields, to be transmitted and stored.

Further, in some cases, plural pieces of data are first restructured to be packet data, and then multiplexed to be transmitted through a transmission medium or to be stored in a storage medium. There has been proposed an international standard "MPEG" (Moving Picture Experts Group) for such data structure and multiplexing, and data is transmitted and stored by a method according to a packet data structure of MPEG.

One system in which such packet data are multiplexed, employs a receiving device which must select data to-be-received from the multiplexed data. In particular, while information such as PSI (Program Specific Information) or SI (Service Information) associated with programs is repeatedly transmitted in a section data format, required information varies depending upon the status of the receiver, for example, which program it has selected, and therefore it becomes necessary to reliably select target information from a variety of information.

A demultiplexer which is conventionally used as a receiver in digital broadcasting which adopts a data multiplexing method according to MPEG, will now be described.

A section comprises an 8-byte section header indicative of type of contained data and section data. Information in the section header is checked to decide whether or not the section contains required data.

In a prior art demultiplexer, the section selecting process is programmed by a processor. Sections which are subjected to the selecting process are stored in a memory. The processor sequentially reads header portions of the sections from the memory, makes comparison between these and parameters (of a header of a section to-be-selected) set in the memory, and decides whether or not a match is found. In some cases, there are 32 or more types of sections which are to be subjected to the selecting process simultaneously. The processor sequentially makes comparisions between the candidate parameters and the input section header, and when there is a match between them, it decides that the section is necessary.

However, there are problems with a method for performing selecting process to sections by the prior art processor, which are described below.

To perform selecting process to sections by the use of the processor, the processor must be capable of performing a 32-bit operation, and making a comparison between 4-byte data and parameters at the same time. To make this comparison, 4 clocks are necessary to read parameter mask information indicating whether or not comparison is to be made for each parameter reading field and store comparison and operation results. When there is a match between fields and 32 types of parameter groups, the section is selected. In the case of a processor which clocks at a processing speed of 40M instructions/sec, it is required that each packet which contains several sections be processed with approximately 1000 clocks, in view of data transmission rate in the digital broadcasting or the like.

Assuming that the number of bytes for comparison is 8 bytes, the number of the maximum clocks which is necessary to perform selecting process to one section is $$4 \text{ clocks} \times (8 \text{ bytes}/4 \text{ bytes}) \times 32 = 256 \text{ clocks.}$$

That is, only 4 sections are subjected to selecting process per packet. Moreover, since processing other than the section selecting process is performed when the packet data is processed, it is not possible to use all the 1000 clocks in the section selecting process.

For instance, in digital broadcasting in Japan, 10 sections at maximum may be transmitted in a packet, and therefore, the prior art processors have poor throughput in the selecting process.

One possible solution is to restrict the types of candidates to 32 or less to make up for lack of throughput.

However, restriction of the candidates means that required sections might not be subjected to selecting process at the same time. In this case, a section and then another section are subjected to selecting process. This method requires long time to perform selecting process and obtain all required information. As a result, the response speed at which a device such as a receiver in digital broadcasting can use this information is reduced.

SUMMARY OF THE INVENTION

It is an object of the present invention to provide a data match detecting apparatus wherein match of data is detected by a small-scale hardware, and processing is carried out every time 1-byte data is input to thereby realize high-speed processing. It is a further object of the present invention to set processing conditions flexibly. It is a yet a further object of the present invention to provide a data selecting apparatus which accomplishes the above objectives.

Other objects and advantages of the present invention will become apparent from the detailed description given hereinafter. It should be understood, however, that the detailed description and specific embodiments are given by way of illustration only, since various changes and modifications within the scope of the invention will become apparent to those skilled in the art from this detailed description.

According to a first aspect of the present invention, a data match detecting apparatus comprises parameter storage means, parameter selecting means, data comparison means, comparison result storage means, and comparison result decision means, wherein plural parameters are set as conditions of selecting a section header, and a section which contains a section header which matches one of the conditions is selected and output. Therefore, each time data is input, it is possible to detect "match" between the input data and the parameter in real time. As a result, upon the input of all the fields which are to be subjected to selecting process, it is decided whether or not the input data should be selected, and hence "match" can be detected at a high speed. In addition, plural header match detecting circuits are provided, to set plural selecting conditions for a field and set one selecting condition for each of the other fields.

According to a second aspect of the present invention, the data match detecting apparatus as defined in the first aspect further comprises parameter mask storage means and parameter mask selecting means, wherein it is decided that there is match between data and a parameter when the corresponding parameter mask indicates "match decision unnecessary" and even if the data is different from the parameter. Therefore, match detection can be performed in the specified field irrespective of the comparison result, and it is possible that a field will always match a selecting condition.

According to a third aspect of the present invention, the data match check detecting apparatus of the first aspect further comprises check type storage means and check type selecting means. When the check type indicates "match check" and there is match between the parameter and the field, it is decided that there is "match". On the other hand, when it indicates "mismatch check" and there is mismatch between the parameter and the field, it is decided that there is "match". Therefore, "mismatch check" between the parameter and the field is performed, and it is possible to select all the data other than the data which satisfies a condition set in a parameter.

According to a fourth aspect of the present invention, the data match detecting apparatus of the first aspect further comprises data selecting means for performing switching of data to be subjected to the comparison process in the data comparison means. Therefore, it is possible to make a comparison between "data which characterizes data comprising plural fields" such as the packet ID and the parameter, at a timing of the field which is not compared to the parameter, whereby processing time for this comparison becomes unnecessary.

According to a fifth aspect of the present invention, a data match detecting apparatus comprises data match detecting apparatus as defined in any of the first to fourth aspects, and match decision means. When the data match detecting apparatus outputs "match", the input data is output. Therefore, several selecting conditions are set as parameters, and data which matches one of the conditions is selected and output.

According to a sixth aspect of the present invention, a data match detecting apparatus comprises parameter storage means, parameter selecting means, data comparison means, plural comparison result storage means for plural parameter groups, comparison result selecting means, and comparison result decision means. According to the sixth aspect, one data comparison means and one comparison result decision means are used to perform match detection between plural parameter groups and input data. Therefore, the same effects as provided by the data match detecting apparatus of the first aspect are obtained.

According to a seventh aspect of the present invention, the data match detecting apparatus of the sixth aspect further comprises parameter mask storage means, and parameter mask selecting means. According to the seventh aspect, it is decided that there is match between data and a parameter when the corresponding parameter mask indicates "match check unnecessary" and even if the data is different from the parameter. Therefore, match detection can be performed in the specified field irrespective of the comparison result, and it is possible that a field always matches a selecting condition.

According to an eighth aspect of the present invention, the data check match detecting apparatus of the sixth aspect further comprises check type storage means and check type selecting means, wherein when the check type indicates "match check" and there is match between the parameter and the field, it is decided that there is "match", while when it indicates "mismatch check" and there is mismatch between the parameter and the field, it is decided that there is "match". Therefore, "mismatch check" between the parameter and the field is performed, and it is possible to select all the data other than the data which satisfies a condition set in a parameter.

According to a ninth aspect of the present invention, the data match detecting apparatus of the sixth aspect further comprises data selecting means for performing switching of data to be subjected to comparison process in the data comparison means. Therefore, it is possible to make comparison between "data which characterizes data comprising plural fields" such as the packet ID and the parameter, at a timing of the field which is not compared to the parameter, whereby processing time for this comparison becomes unnecessary.

According to a tenth aspect of the present invention, a data match detecting apparatus comprises data match detecting apparatus as defined in any of the sixth to ninth aspects, and match decision means, wherein input data is output only when the data match detecting apparatus outputs "match". Therefore, it is possible to select and output data including fields which match a parameter group.

According to an eleventh aspect of the present invention, a data selecting apparatus comprises the data match detecting apparatus as defined in any of first to tenth aspects, data delay means, and output control means, wherein input data is delayed until the result of match detection between the fields and the parameters is obtained. Therefore, delayed input data is selected and output only when the match decision circuit outputs "match".

DETAILED DESCRIPTION OF THE PREFERRED EMBODIMENTS

Now, a description is given of a section data selecting circuit (data selecting apparatus) for performing selecting process to various types of information transmitted in a section data format as necessary, and a header match detecting circuit (data match detecting device) therein, for digital broadcasting according to MPEG standard.

Figure 1:
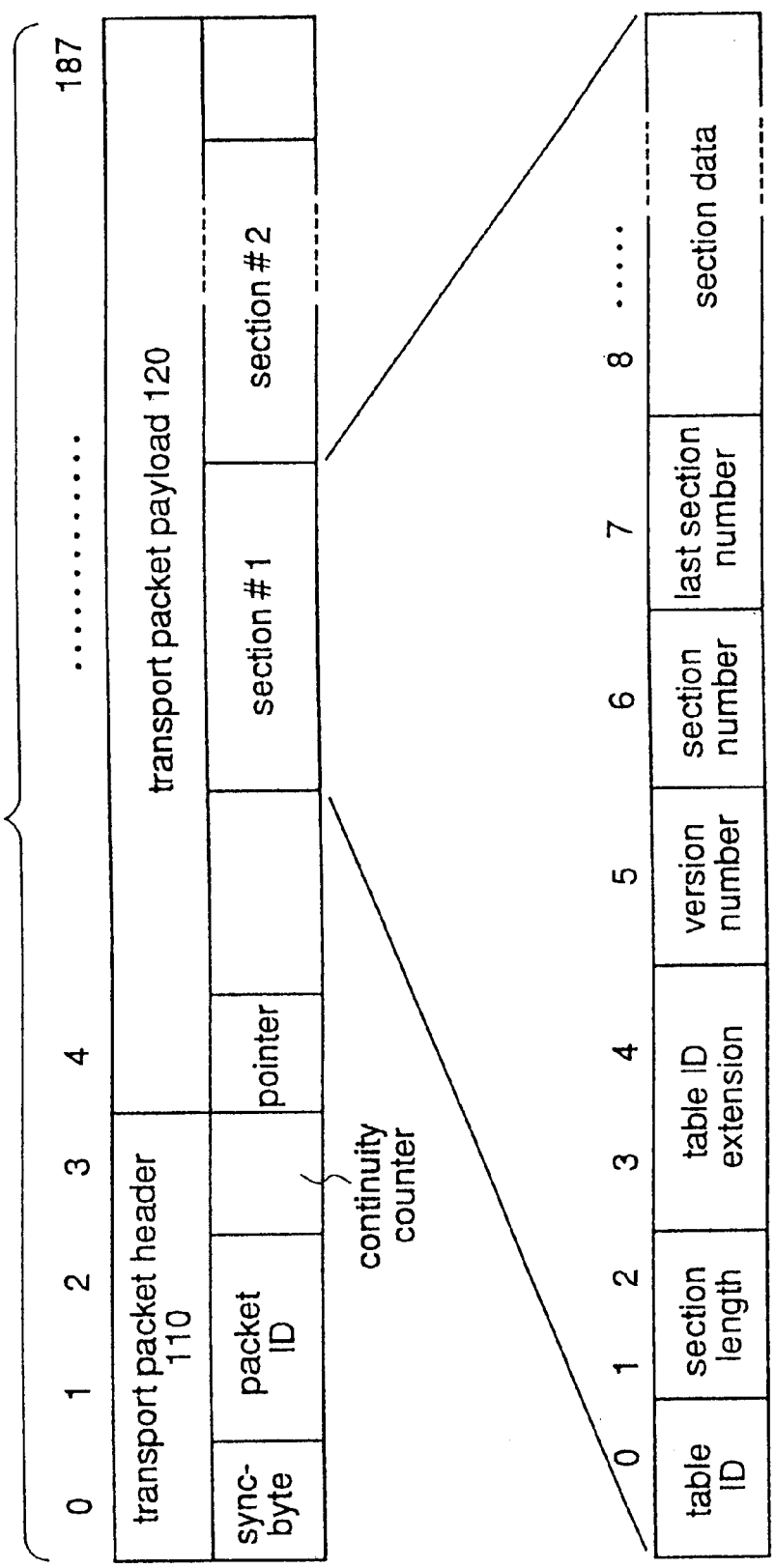
FIG. 1 is a diagram showing a transport stream packet and a format of sections.

In digital broadcasting, video, audio or other information are transmitted in a transport stream. In the transport stream, transport stream packets each having a fixed length are sequentially transmitted. FIG. 1 shows a transport stream packet 100 and a format of a section which contains tables of various types of data in the transport stream packet 100.

Referring to FIG. 1, the transport stream packet 100 comprises a transport packet header 110 comprising a packet identification number and so forth, and a transport packet payload 120 as data body transmitted in a packet. The video or audio information is stored in the payload 120 in PES (Packetized Elementary System) packets. Various information associated with broadcasting or programs (program association table or key information for encryption) are stored in the payload 120 in section formats. The transport stream packet 100 contains these sections. The transport stream packet 100 contains plural sections #1, #2, . . . . In addition, a section data format is shown. The section comprises information indicating types of data such as a table identifier (ID), a section length, a table ID extension, a version number, a section number, a last section number, and data body. From the table ID, it is decided whether or not the section data is necessary.

Figure 2:
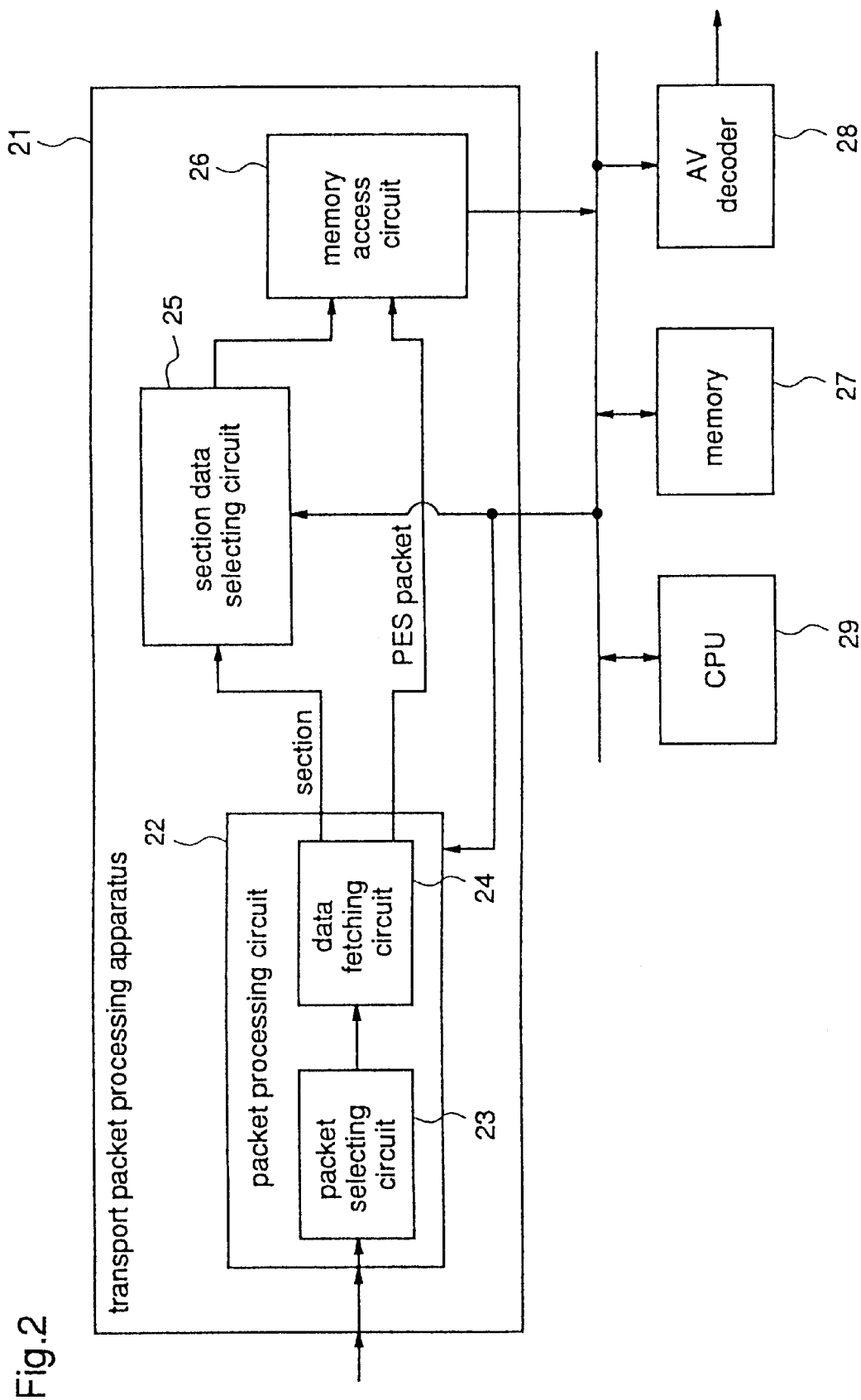
FIG. 2 is a block diagram showing a digital broadcasting receiver.

FIG. 2 schematically shows a construction of a transport packet processing apparatus 21 as a system of a receiver of digital broadcasting. An input transport stream is first processed by a packet processing circuit 22. For the transport stream packet 100, selecting process is performed by a packet selecting circuit 23 on a transport stream packet basis, and then data is fetched from the transport stream payload 120 by a data fetching circuit 24. At this time, the video or audio information is fetched as the PES packets, and written into a memory 27 by a memory access circuit 26, to be buffered therein. This information is fetched from the memory 27 by an AV decoder 28, and video or audio is reproduced, followed by display and output. Meanwhile, the various information associated with programs or broadcasting is fetched from the Payload 120 as a section, which is input to a section data selecting circuit 25, where it is decided whether or not the section is necessary. The selected section is written to the memory 27 by the memory access circuit 26. Thereafter, a CPU 29 fetches the various information from the memory 29, and uses it to control operation of a receiver or the like.

As an example of the various information transmitted in section units, there is key information for encryption of video or audio. This is important information and therefore the same information is broadcast repeatedly to ensure that it is received, because it is impossible to reproduce the video or audio without it. However, once it is received, it is not necessary to receive the information again. Therefore, it is necessary to select and obtain a section which contains the key information until it is received, but once received, this section becomes unnecessary, and will not be received again. The key information is illustrative, and the need for the other various information depends upon status of the receiver. If information which is not required is abandoned, then the amount of data to be processed by CPU is reduced, resulting in improved throughput of the receiver.

Embodiment 1

A description is given of a case where a section data selecting circuit of a first embodiment performs selecting process to section data according to four fields, i.e., a table ID, a table ID extension, a version number, and a section number. In this embodiment, assume that sections shown in the following table 1 are subjected to selecting process.

TABLE 1

|  | table ID | table ID extension | version number | section number |
| --- | --- | --- | --- | --- |
| 1st section | 01h | 2345h | 06h | 00h |
| 2nd section | 01h | arbitrary | 04h | arbitrary |
| 3rd section | 03h | 6789h | 00h | 00h, 01h |

Figure 3:
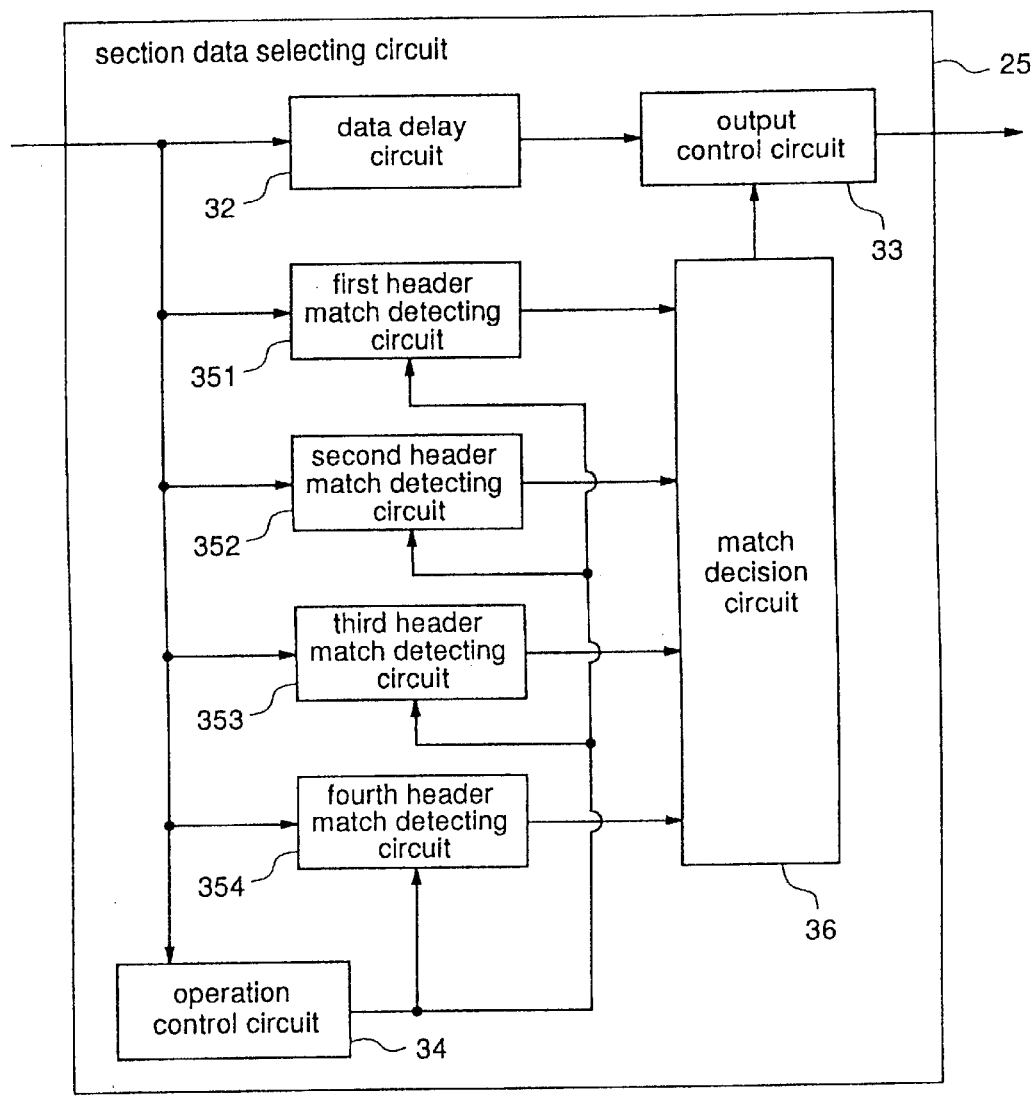
FIG. 3 is a diagram showing a construction of a section data selecting circuit of the first, second and third embodiments of the present invention.

FIG. 3 shows the section data selecting circuit referred to by reference numeral 25. Input section is supplied to a data delay circuit 32, first to fourth header match detecting circuits 351, 352, 353, and 354, and an operation control circuit 34. The first to fourth circuits 351, 352, 353, and 354 each make a comparison between a header of the input section and a preset candidate parameter, and then decide whether or not there is match between the input data and the preset parameter.

In a case where at least one of the circuits 351, 352, 353, and 354 has detected "match", a match decision circuit 36 decides that there is "match". The role of the data delay circuit 32 is to delay the input section until it has been decided whether or not its section header matches that of the candidate by the circuits 351–354. The section data output from the data delay circuit 32 is input to the output control circuit 33, which outputs "match" section data. In this manner, the section data selecting circuit 25 is capable of selecting and outputting section data which matches at least one of plural section candidates. The role of the operation control circuit 33 is to control operating timings of respective units of the data selecting circuit 25 depending on section data input in field units.

Figure 4:
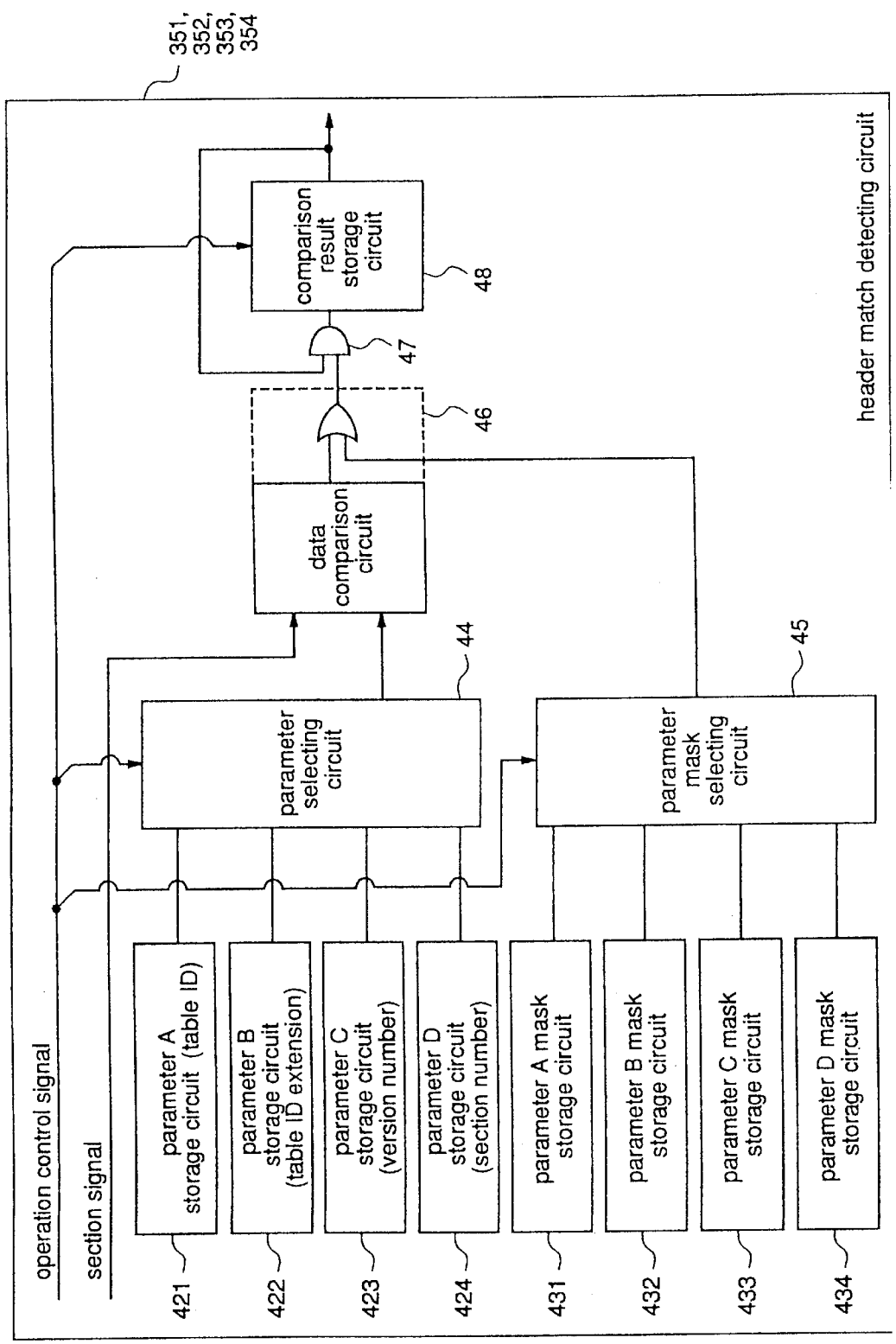
FIG. 4 is a diagram showing a construction of a header match detecting circuit of the first embodiment of the present invention.

Referring to FIG. 4, shown are the header match detecting circuits (data match detecting devices) 351–354. Each of the circuits 351–354 comprises plural parameter storage circuits 421, 422, 423, and 424, a parameter selecting circuit 44, a parameter mask selecting circuit 45, a data comparison circuit 46, a comparison result decision circuit 47, and a comparison result storage circuit 48.

The parameter storage circuits 421–424 each contain a parameter to be compared to a field of the input data.

The parameter selecting circuit 44 selects a parameter for the input field from those of the parameter storage circuits 421–424.

The parameter mask storage circuits 431–434 contain parameter masks for plural parameters, respectively, each indicating whether or not it is necessary to detect match between the corresponding parameter and the input data. The parameter mask selecting circuit 45 selects a parameter mask from those of the parameter mask storage circuits 431–434.

The data comparison circuit 46 receives the section data, the parameter selected by the parameter selecting circuit 44, and the parameter mask selected by the parameter mask selecting circuit 45, as inputs. When the parameter mask indicates "match detection necessary", the circuit 46 compares the input data to the parameter, and outputs "match" when there is match between them, while when the parameter mask indicates "match detection unnecessary", the circuit 46 outputs "match" irrespective of input data or the parameter.

The comparison result storage circuit 48 initializes its storage content to "match" for each section, and then stores the input from the comparison result decision circuit 47.

The comparison result decision circuit 47 outputs "match" when the output of the data comparison circuit 46 and the output of the comparison result storage circuit 48 both indicate "match", and otherwise outputs "mismatch", the output being stored in the comparison storage circuit 48.

Respective fields of the section header are sequentially input, comparison is made by the use of the corresponding parameters or parameter masks, and the comparison results are stored in the comparison result storage circuit 48. Thereby, at the input of the last data of the section header, it is possible to decide whether or not the section matches the candidate.

Operation will be described in more detail. In a case where candidates shown in the following table 1 are subjected to selecting process, parameters shown in table 2 to table 5 are set in the first to fourth header match detecting circuits 351–354, respectively.

TABLE 2

Parameters Set in First Header Match Detecting Circuit 351

| | |
|---|---|
| parameter A storage circuit (table ID) | 01h |
| parameter B storage circuit (table ID extension) | 2345h |
| parameter C storage circuit (version number) | 06h |
| parameter D storage circuit (section number) | 00h |
| parameter A mask storage circuit | match detection necessary |
| parameter B mask storage circuit | match detection necessary |
| parameter C mask storage circuit | match detection necessary |
| parameter D mask storage circuit | match detection necessary |

TABLE 3

Parameters Set in Second Header Match Detecting Circuit 352

| | |
|---|---|
| parameter A storage circuit (table ID) | 01h |
| parameter B storage circuit (table ID extension) | arbitrary |
| parameter C storage circuit (version number) | 04h |
| parameter D storage circuit (version number) | arbitrary |
| parameter A mask storage circuit | match detection necessary |
| parameter B mask storage circuit | match detection unnecessary |
| parameter C mask storage circuit | match detection necessary |
| parameter D mask storage circuit | match detection unnecessary |

TABLE 4

Parameters Set in Third Header Match Detecting Circuit 353

| | |
|---|---|
| parameter A storage circuit (table ID) | 03h |
| parameter B storage circuit (table ID extension) | 6789h |
| parameter C storage circuit (version number) | 00h |
| parameter D storage circuit (section number) | 00h |
| parameter A mask storage circuit | match detection necessary |
| parameter B mask storage circuit | match detection necessary |
| parameter C mask storage circuit | match detection necessary |
| parameter D mask storage circuit | match detection necessary |

TABLE 5

Parameters Set in Forth Header Match Detecting Circuit 354

| | |
|---|---|
| parameter A storage circuit (table ID) | 03h |
| parameter B storage circuit (table ID extension) | 6789h |
| parameter C storage circuit (version number) | 00h |

TABLE 5-continued

Parameters Set in Forth Header Match Detecting Circuit 354

| | |
|---|---|
| parameter D storage circuit (section number) | 01h |
| parameter A mask storage circuit | match detection necessary |
| parameter B mask storage circuit | match detection necessary |
| parameter C mask storage circuit | match detection necessary |
| parameter D mask storage circuit | match detection necessary |

Here it is assumed that a section shown in the following table 6 is input.

TABLE 6

| | table ID | table ID extension | version number | section number |
|---|---|---|---|---|
| input section | 01h | 2345h | 06h | 00h |

The comparison result storage circuit 48 in each of the first to fourth header match detecting circuits 351–354 is initialized to "match" for each section before it is input.

Initially, "01h" is input as a first field. The parameter selecting circuit 44 in each of the first to fourth header match detecting circuits selects a parameter A. The parameter mask selecting circuit 45 in each of them selects a parameter A mask. In the data comparison circuit 46 in each of the first and second header match detecting circuits 351 and 352, the comparison result is "match" between the input data and the parameter. The "match" is stored in the comparison result storage circuit 48 in each of the circuits 351 and 352. On the other hand, the output of the data comparison circuit 46 in each of the third and fourth header match detection circuits 353 and 354, is "mismatch". The "mismatch" is stored in the comparison result storage circuit 48 in each of the circuits 353 and 354. The "mismatch" output from the comparison result storage circuit 48 is input to the comparison result decision circuit 47. The decision circuit 47 outputs "mismatch", to be stored in the storage circuit 48 when the "mismatch" is input from the circuit 48, regardless of whether the input from the data comparison circuit 46 is "match" or "mismatch". For this reason, with respect to the following fields, whatever the input data is, the storage circuit 48 in each of the circuits 353 and 354 outputs "mismatch".

Subsequently, "2345h" is input as a second field. In the first header match detecting circuit 351, a parameter B=2345h is selected, and therefore the data comparison circuit 46 outputs "match", and the comparison result storage circuit 48 stores and outputs "match". In the second header match detecting circuit 352, the parameter B is set to an arbitrary value, which might not match the input data. However, since "match detection unnecessary" is set in the parameter B mask, the comparison circuit 46 outputs "match" and the storage circuit 48 stores "match".

Then, "06h" is input as a third field. The parameter C of the first header match detecting circuit 351 is "06h", and therefore "match" is detected and stored. On the other hand, the parameter C of the second header match detecting circuit 352 is "04h", and therefore "mismatch" is detected and stored.

As concerns the fourth field, in the first header match detecting circuit 351, "match" is detected and stored. In the third header match detecting circuit 353, the parameter D is "00h", and therefore the data comparison circuit 46 detects "match" between the input data and the parameter. However, "mismatch" is already stored in the comparison result storage circuit 48, and therefore "mismatch" is stored therein by the decision circuit 47.

In this manner, when the section which contains the above header, "match" between the data and the parameters is detected only by the first match detecting circuit 351. Thus, since "match" is detected by at least one header match detecting circuit, the input section is selected and output.

Now, assume that a section shown in the following table 7 which corresponds to the second section in table 1 is input.

TABLE 7

|  | table ID | table ID extension | version number | section number |
|---|---|---|---|---|
| input section | 01h | 3456h | 04h | 00h |

As described above, for the table ID "01h", "match" is found by the first and second header match detecting circuits 351 and 352. Although the table ID extension "3456h" mismatches all the parameters in the parameter B storage circuits, a parameter B mask is "match detection unnecessary", in the second header match detecting circuit 352, and therefore this is assumed to be "match". The version number "04h" matches a parameter C in the second header match detecting circuit 352. Further, as for the section number "00h", a parameter D mask is "match detection unnecessary" in the second header match detecting circuit 352. Therefore, it is decided that all the fields match the parameters. As a result, the section is selected and output.

Next, assume that a section shown in the following table 8 which corresponds to the third section in table 1 is input.

TABLE 8

|  | table ID | table ID extension | version number | section number |
|---|---|---|---|---|
| input section | 03h | 6789h | 00h | 00h |

In this case, "match" is detected only by the third header match detecting circuit 353, and the section is selected and output.

Likewise, when a section in the following table 9 which corresponds to the third section in table 1 is input, "match" is detected only by the fourth header match detecting circuit 354, and the section is selected and output.

TABLE 9

|  | table ID | table ID extension | version number | section number |
|---|---|---|---|---|
| input section | 03h | 6789h | 00h | 01h |

Thus, in accordance with the section data selecting circuit of the first embodiment, plural parameters are set as conditions of selecting a section header, and a section which contains a section header which matches one of the conditions is selected and output. Therefore, each time data is input, it is possible to detect "match" between the input data and the parameter in real time. Thereby, at the input of all the fields which are to be subjected to selecting process, it is decided whether or not the input data should be selected, and hence "match" can be detected at a high speed. In addition, plural header match detecting circuits are provided, to set plural selecting conditions in a field and set one type of selecting condition in each of the other fields. Moreover, since parameter masks are used to set fields for which comparison is unnecessary, it is possible that a field always matches the condition. As should be appreciated from the foregoing, since it is possible to set selecting conditions most flexibly, plural sections to be subjected to selecting process can be set, and only the necessary sections are reliably selected and output.

Figure 5:
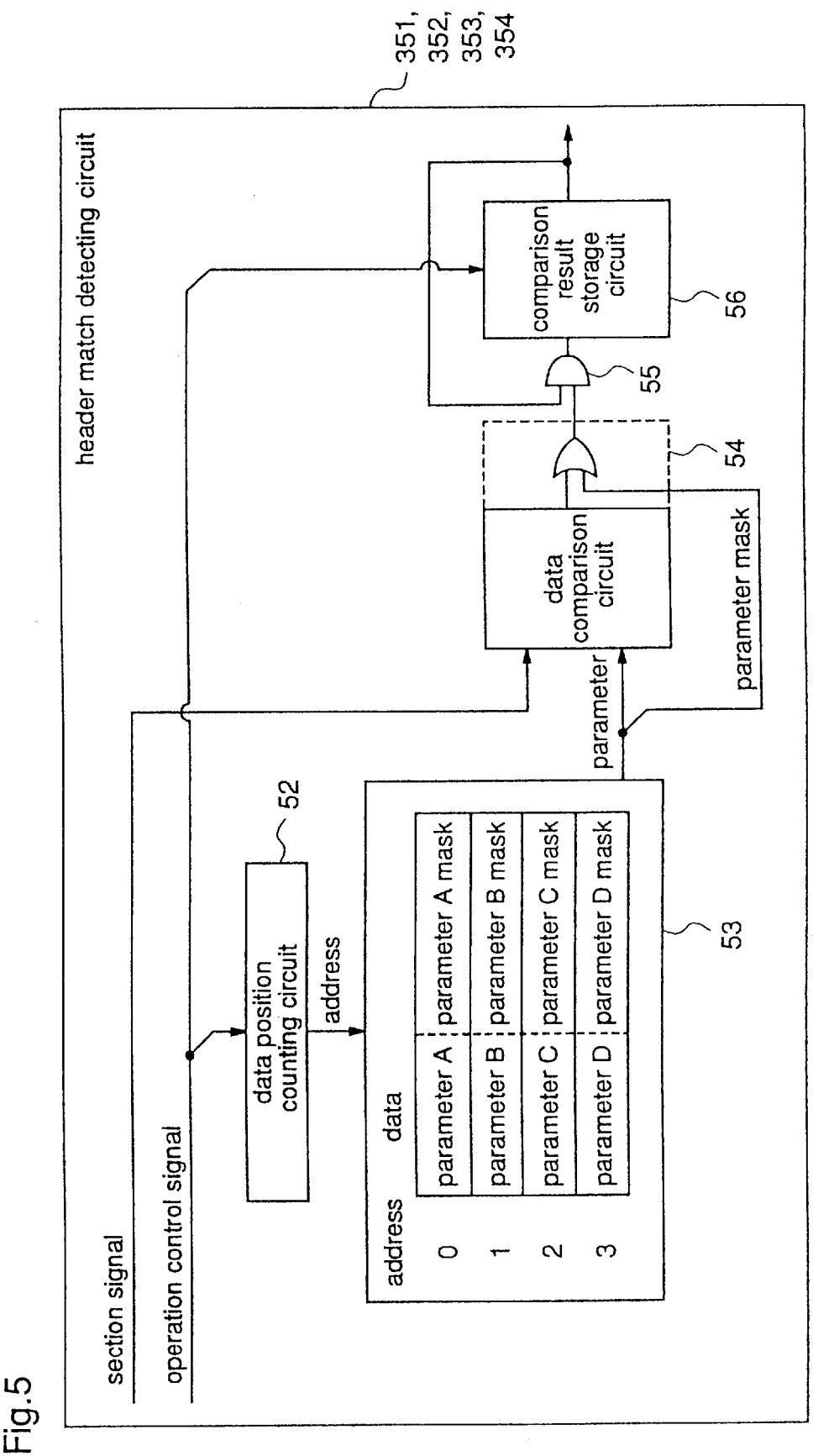
FIG. 5 is a diagram showing a construction of another header match detecting circuit of the first embodiment of the present invention.

FIG. 5 shows another header match detecting circuit.

According to this header match detecting circuit, parameters and parameter masks are stored in a memory 53, and every time data is input, a read address is increased by a data position counting circuit 52, and thereby a parameter and a parameter mask which correspond to an input field can be read therefrom.

Alternatively, this header match detecting circuit may be used in the section data selecting circuit, by setting parameters and parameter masks, which functions as in the case of the first embodiment in FIG. 4.

Embodiment 2

Figure 6:
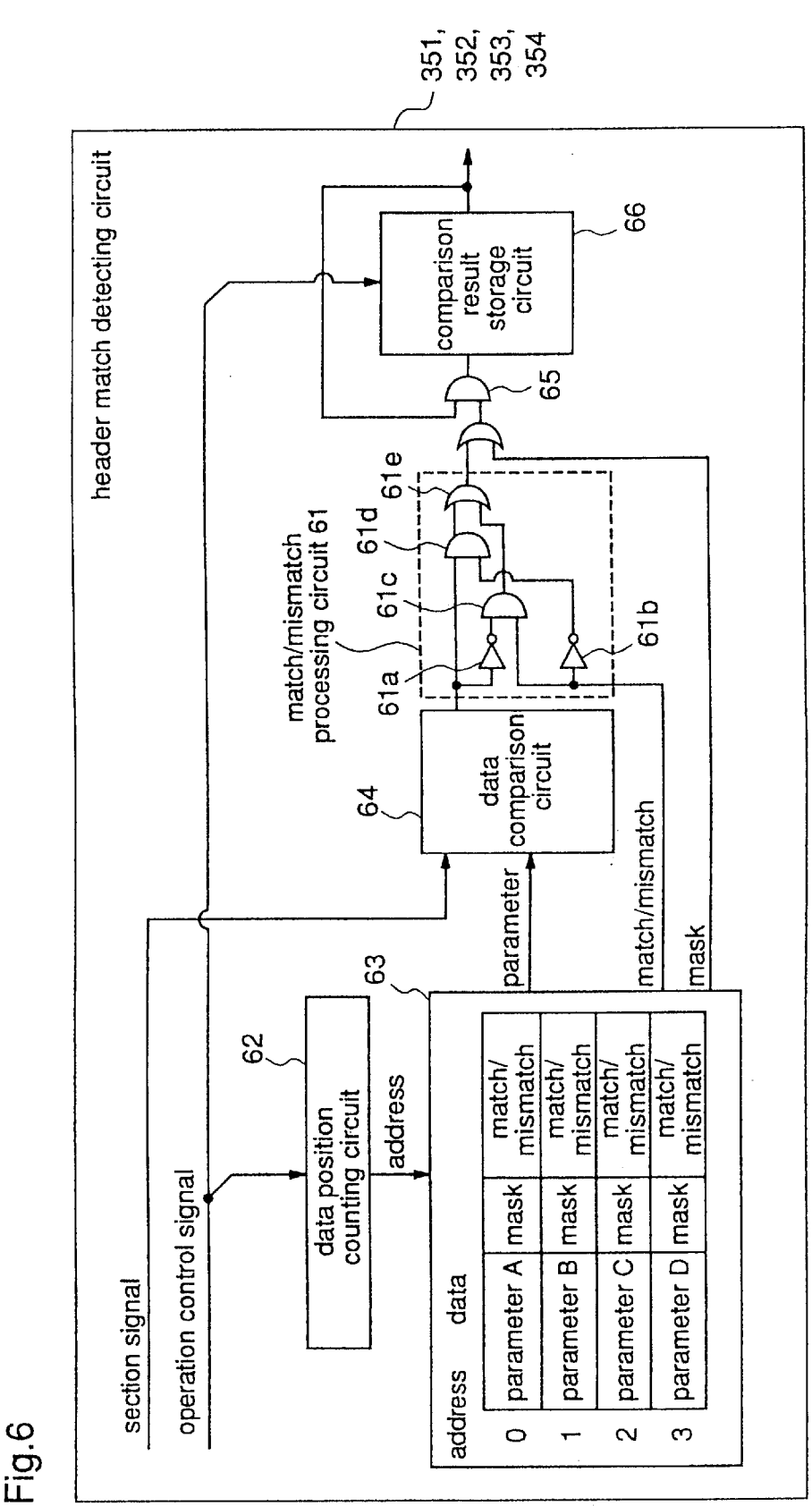
FIG. 6 is a diagram showing a construction of a header match detecting circuit of a second embodiment of the present invention.

FIG. 6 shows a header match detecting circuit according to a second embodiment of the present invention. The section data selecting circuit of the second embodiment includes the header match detecting circuit in FIG. 6. In FIG. 6, the same reference numerals as those in FIG. 5 designate the same or corresponding parts. The header match detecting circuit of the second embodiment differs from that of the first embodiment in that it includes a match/mismatch processing circuit 61, and each parameter entry has a storage area in which "match check/mismatch check" between the input data and the corresponding parameter is set.

The match/mismatch processing circuit 61 includes two NOT circuits 61a and 61b, two AND circuits 61c and 61d, and an OR circuit 61e. The circuit 61 operates as follows.

In a case where "match check" between a section signal as input data and a parameter in the memory 63 is performed, "match" is set in a "match/mismatch" setting area in the memory 63. Through this setting, the output of the data comparison circuit 64 becomes the output of the match/mismatch processing circuit 61. The circuit operates as in the case of the first embodiment.

In another case where "mismatch check" between a section signal as input data and a parameter in the memory 63 is performed, "mismatch" is set in a "match/mismatch" setting area in the memory 63. Through this setting, when "match" is output from the data comparison circuit 64, "mismatch" is output from the match/mismatch processing circuit 61, whereas when "mismatch" is output from the data comparison circuit 64, "match" is output from the match/mismatch processing circuit 61. In other words, the "mismatch" is checked.

This operation will be described in more detail. Assume that a candidate shown in the following table 10 is subjected to selecting process.

TABLE 10

|  | table ID | table ID extension | version number | section number |
|---|---|---|---|---|
| section | 01h | other than 234h | 05h | 00h |

In this case, parameters and parameter masks are set in the memory 63 as shown in the following table 11

TABLE 11

| parameter A (table ID) | 01h |
|---|---|
| parameter B (table ID extension) | 234h |
| parameter C (version number) | 05h |
| parameter D (section number) | 00h |
| parameter A mask | match detection necessary |
| parameter B mask | match detection necessary |
| parameter C mask | match detection necessary |
| parameter D mask | match detection necessary |
| parameter A match/mismatch | match |
| parameter B match/mismatch | mismatch |
| parameter C match/mismatch | match |
| parameter D match/mismatch | match |

Here it is assumed that a section shown in the following table 12 is input.

TABLE 12

| | table ID | table ID extension | version number | section number |
|---|---|---|---|---|
| section | 01h | 200h | 05h | 00h |

The comparison result storage circuit 66 is initialized to "match".

Initially, "01h" is input as a first field. The data position counting circuit 62 outputs an address "0". A parameter A, a parameter A mask, and a parameter A match/mismatch in the memory 63 are selected.

The comparison result of the data comparison circuit 64 is "match", and the "match" is stored in the comparison result storage circuit 66.

Subsequently, "200h", as a second field, is input. The data position counting circuit 62 indicates "1", and a parameter B, a parameter B mask, and parameter B match/mismatch in the memory 63 are selected. In this case, since "mismatch" is indicated and the set value of the parameter B 234h≠200h, the output of the match/mismatch processing circuit 63 is "match", and the comparison result storage circuit 66 contains "match", so that the comparison result decision circuit 65 stores "match" in the comparison result storage circuit 66.

Thereafter, the same operation is performed, and the input section is selected according to the set parameter group.

Thus, in accordance with the second embodiment, the header match detecting circuit of the first embodiment includes the match/mismatch processing circuit 61 and the storage area in each parameter entry in the memory 63, which sets data "match check" between the input data and the parameter or data "mismatch check" between them, and thereby the "mismatch check" as well as "match check" can be performed. As a result, it is possible to select all the data other than the data which satisfies a condition set in a parameter.

While in the second embodiment the parameter storage circuit and the parameter mask storage circuit are implemented by the memory, they may be implemented by the parameter storage circuit and the parameter mask storage circuit shown in FIG. 4 as in the case of the first embodiment, respectively.

Embodiment 3

Figure 7:
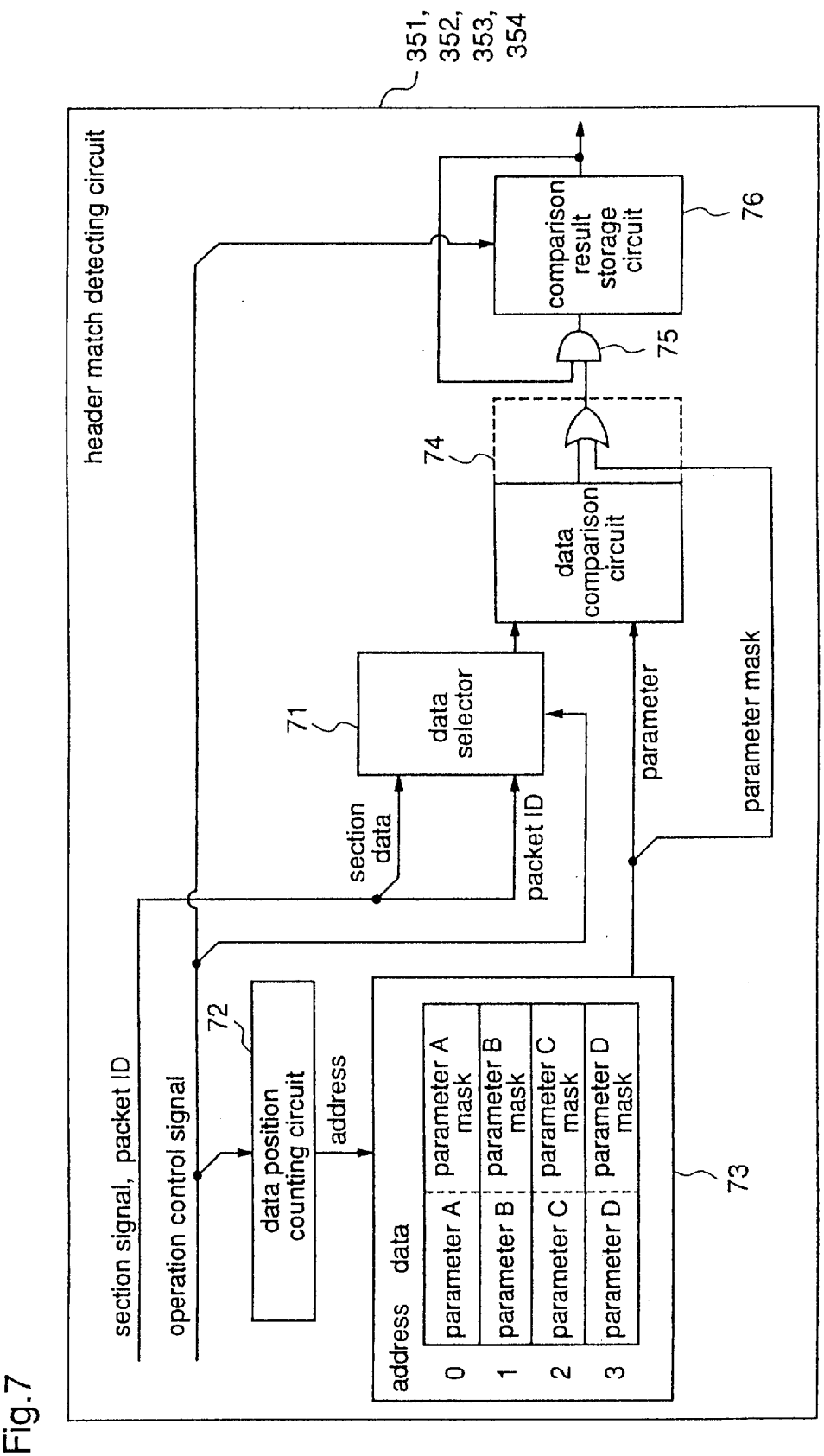
FIG. 7 is a diagram showing a construction of a header match detecting circuit of a third embodiment of the present invention.

FIG. 7 shows a header match detection circuit of a third embodiment of the present invention.

A section data selecting circuit of the third embodiment includes a header match detecting circuit in FIG. 7. In FIG. 7, the same reference numerals as in FIG. 5 designate the same or the corresponding parts. The header match detection circuit of the third embodiment differs from that of the first embodiment in that it is provided with a data selector 71 which receives a control signal as an input and controls the timing at which switching of data for comparison by a data selecting circuit 74 is performed.

The operation is described in more detail. Assume that a candidate in the following table 13 is subjected to selecting process.

TABLE 13

| | table ID | table length | table ID extension | version number | (packet ID) |
|---|---|---|---|---|---|
| section | 01h | arbitrary | 06h | 00h | 07h |

From this table, it is shown that section length is "arbitrary". The section length indicates the size of section data, and has nothing to do with types of data in that section. For this reason, the section length is not necessary to perform the section selecting process.

In some cases, the selecting process according to a packet ID of a transport stream packet which contains the section, becomes necessary, in addition to checking fields of the section. In such cases, conventionally, the selecting process according to the packet ID is performed by software to the section which has been selected by the section data selecting circuit 25. In this embodiment, this is performed by using the timing of the "section length" which is not used for the section selecting process.

In this case, parameters and parameter masks are set in the memory 73 as shown in the following table 14.

TABLE 14

| parameter A (table ID) | 01h |
|---|---|
| parameter B (packet ID) | 07h |
| parameter C (table ID extension) | 06h |
| parameter D (version number) | 00h |
| parameter A mask | match detection necessary |
| parameter B mask | match detection necessary |
| parameter C mask | match detection necessary |
| parameter D mask | match detection necessary |

Here it is assumed that a section shown in the following table 15 is input.

TABLE 15

| | table ID | table length | table ID extension | version number | (packet ID) |
|---|---|---|---|---|---|
| section | 01h | arbitrary | 06h | 00h | 07h |

A comparison result storage circuit 76 is initialized to "match" before a section is input.

Initially, "01h" as a first field is input. A data position counting circuit 72 outputs an address "0", and a parameter A and a parameter A mask are selected. The comparison result of data comparison circuit 74 is "match", and "match" is stored in a comparison result storage circuit 76, and therefore a comparison result decision circuit 75 stores "match" in the storage circuit 76.

Subsequently, the data position counting circuit 72 outputs an address "1", and a parameter B and a parameter B mask in the memory 73 are selected.

At this time, data to be subjected to comparison process is not section data but a packet ID. Therefore, the data selector 71 selects the packet ID in accordance with an operation control signal and inputs it to the data comparison circuit 74.

The comparison result of the data comparison circuit 74 is "match", and "match" is stored in the comparison result storage circuit 76, and therefore the comparison result decision circuit 75 stores "match" in the storage circuit 76.

Thereafter, the same operation is performed.

For creation of the control signal to the data selector 71, an operation control circuit 34 is provided with a counter. A counter's value is initialized every time a section is input, and counted up every time a field is input.

In a case where the counter's value is a value shown in the following table 16, the data selector 71 selects the packet ID when it is "1".

TABLE 16

|  | table ID | table ID extension | version number | section number |
|---|---|---|---|---|
| Counter's value | 0 | 1 | 2 | 3 |

Alternatively, values of the data position counting circuit may be used.

Thus, in accordance with the third embodiment, the header match detecting circuit of the first embodiment is provided with the data selector 71 for performing switching of data to be subjected to comparison process in the data comparison means. Therefore, it is possible to make comparison between "data which characterizes data comprising plural fields" such as the packet ID and the parameter, at a timing of the field which is not compared to the parameter, whereby processing time for this comparison becomes unnecessary.

While in the third embodiment, the description has been given of the case where comparison is made between one "data which characterizes data comprising plural fields" such as the packet ID and the parameter, the data selector may have multiple inputs to make comparison between plural pieces of "data which characterizes data comprising plural fields" such as the packet IDs and the parameters.

Besides, while in the third embodiment the parameter storage circuit and the parameter mask storage circuit are implemented by the memory, they may be implemented by the parameter storage circuit and the parameter mask storage circuit shown in FIG. 4 as described in the first embodiment, respectively.

Embodiment 4

A description is given of a section data selecting circuit according to a fourth embodiment of the present invention.

Figure 8:
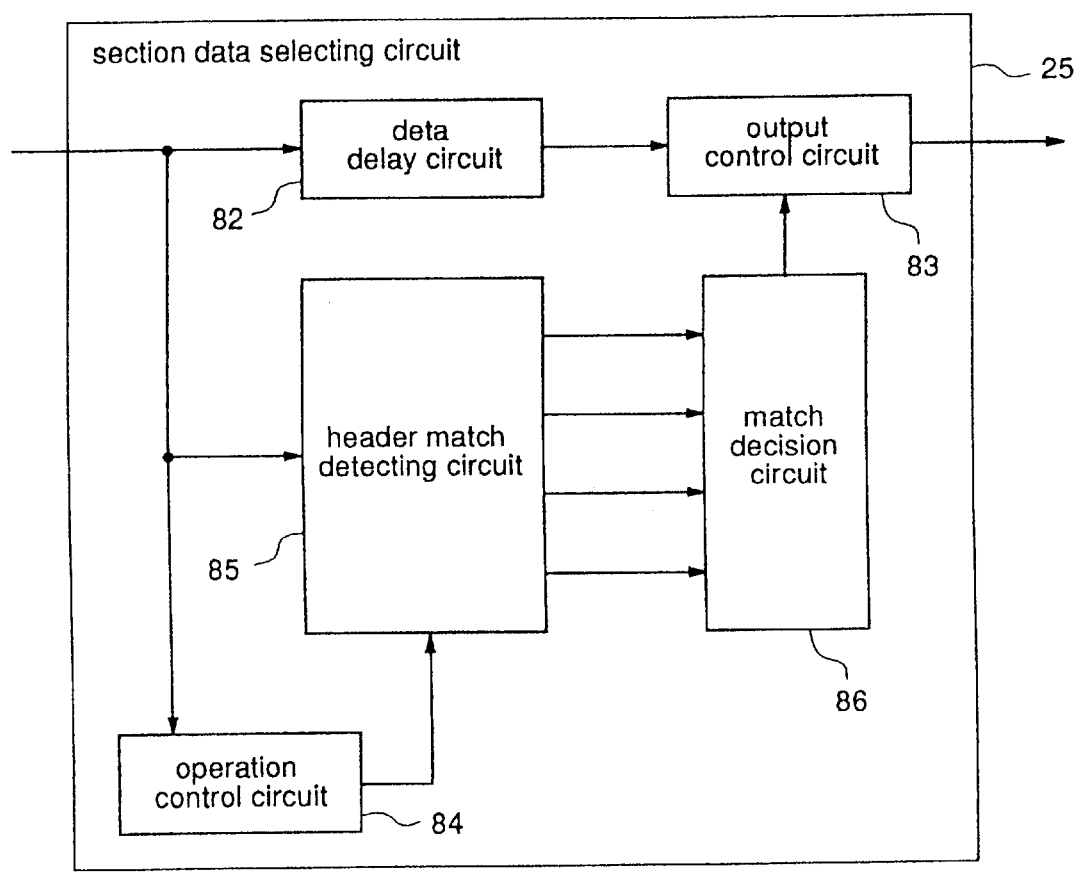
FIG. 8 is a diagram showing a construction of a section data selecting circuit of fourth, fifth, and sixth embodiments of the present invention.
Figure 9:
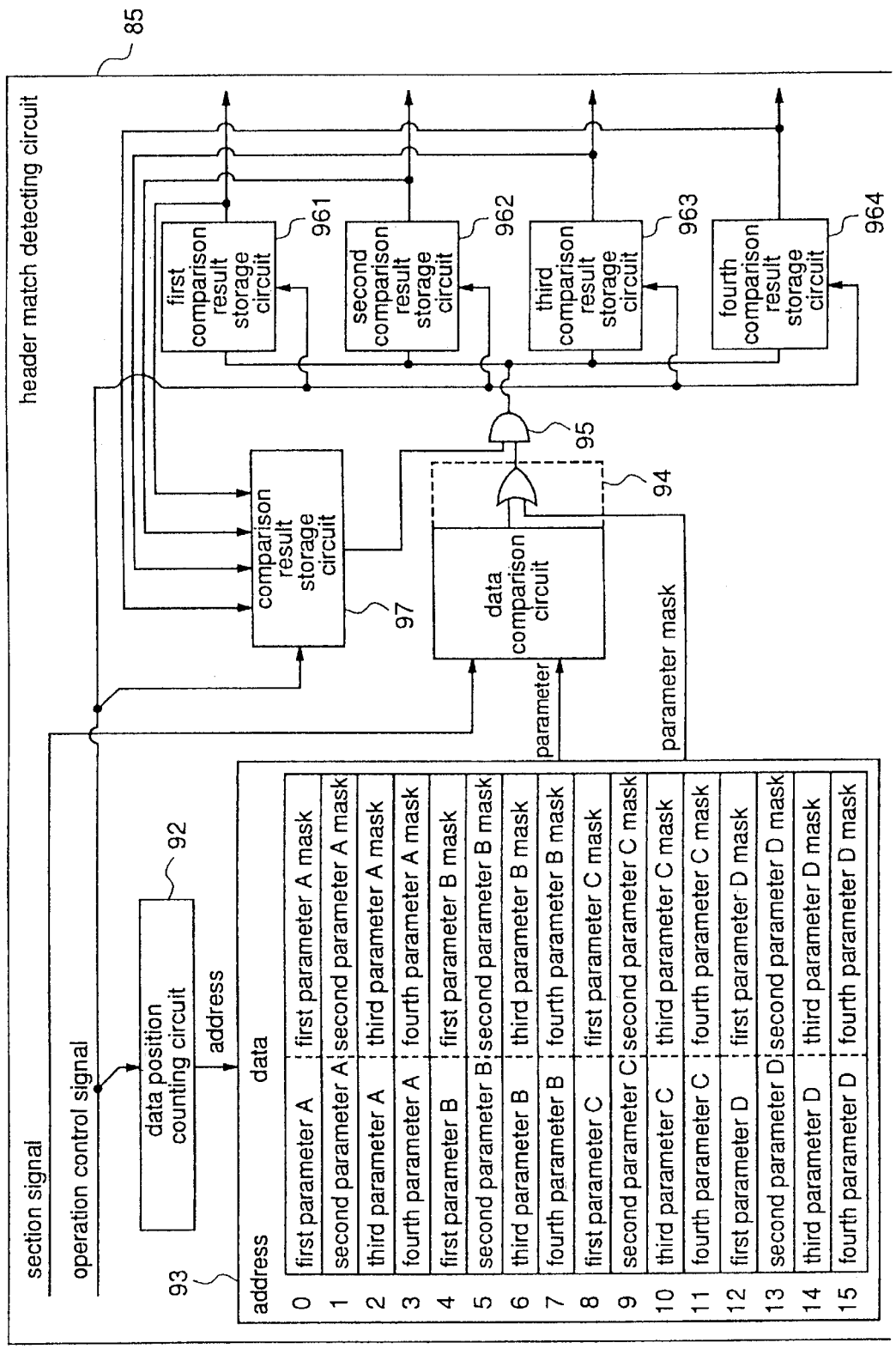
FIG. 9 is a diagram showing a header match detecting circuit of the fourth embodiment of the present invention.

Referring now to FIG. 8, plural header match detecting circuits 351–354 in the section data selecting circuit 25 in FIG. 3 are replaced by a header match detecting circuit 85 in FIG. 9.

In the header match detecting circuit 85 in FIG. 9, parameters and parameter masks are stored in a memory 93. A data position counter 92 is counted up four times every time a field is input.

Parameter storage circuits and parameter mask storage circuits are implemented by the memory 93. In addresses "0", "1", "2", and "3", first to fourth parameters A and parameter A masks are set, respectively. In addresses "4", "5", "6", and "7", first to fourth parameters B and parameter B masks are set, respectively. In addresses "8", "9", "10", and "11", first to fourth parameters C and parameter C masks are set, respectively. In addresses "12", "13", "14", and "15", first to fourth parameters D and parameter D masks are set, respectively.

A data comparison circuit 94 receives section data, and a parameter and a parameter mask as input data output from the memory 93 as inputs. When the parameter mask indicates "match detection necessary", the comparison circuit 94 makes comparison between the input data and the parameter, and outputs "match" when a match is found. On the other hand, the circuit 94 outputs "match", irrespective of the input data or the parameter when the parameter mask indicates "match decision unnecessary".

The first to fourth comparison storage circuits 961, 962, 963, and 964 initialize their storage contents "match" for each section. Then, when comparison has been made for the first parameter, the first comparison result storage circuit 961 stores an input from a comparison result decision circuit 95. Second, third and fourth circuits 962, 963, and 964 store inputs from the decision circuit 95 when a comparison has been made for the corresponding parameters.

A comparison result selecting circuit 97 receives the outputs of the first to fourth storage circuits 961–964 as inputs, selects and outputs the output of the first storage circuit 961 when comparison has been made for the first parameter, and selects and outputs the outputs of the storage circuits 962–964 when comparison has been made for the second to fourth parameters.

The comparison result decision circuit 95 outputs "match" when the output of the data comparison circuit 94 and the output of the comparison result selecting circuit 97 are respectively "match". Otherwise, it outputs "mismatch", the "match" or the "mismatch" being stored in one of the storage circuits 961–964.

Respective fields of a section header are sequentially input and compared to the corresponding first to fourth parameters or parameter masks. The comparison results are stored in the storage circuits 961–964. Thereby, at the input of last data of the section header, it is decided which of first to fourth candidates matches this section.

This operation will be described in more detail. When the candidate shown in table 1 is selected, parameters and parameter masks are set in the memory 93 as shown in the following table 17.

TABLE 17

| | |
|---|---|
| first parameter A (table ID) | 01h |
| first parameter B (table ID extension) | 2345h |
| first parameter C (version number) | 06h |
| first parameter D (section number) | 00h |
| first parameter A mask | match detection necessary |
| first parameter B mask | match detection necessary |
| first parameter C mask | match detection necessary |
| first parameter D mask | match detection necessary |
| second parameter A (table ID) | 01h |
| second parameter B (table ID extension) | arbitrary |
| second parameter C (version number) | 04h |
| second parameter D (section number) | arbitrary |
| second parameter A mask | match detection necessary |
| second parameter B mask | match detection unnecessary |
| second parameter C mask | match detection necessary |
| second parameter D mask | match detection unnecessary |
| third parameter A (table ID) | 03h |
| third parameter B (table ID extension) | 6789h |

TABLE 17-continued

| | |
|---|---|
| third parameter C (version number) | 00h |
| third parameter D (section number) | 00h |
| third parameter A mask | match detection necessary |
| third parameter B mask | match detection necessary |
| third parameter C mask | match detection necessary |
| third parameter D mask | match detection necessary |
| fourth parameter A (table ID) | 03h |
| fourth parameter B (table ID extension) | 6789h |
| fourth parameter C (version number) | 00h |
| fourth parameter D (section number) | 01h |
| fourth parameter A mask | match detection necessary |
| fourth parameter B mask | match detection necessary |
| fourth parameter C mask | match detection necessary |
| fourth parameter D mask | match detection necessary |

Here it is assumed that a section shown in the following table 18 is input.

TABLE 18

| | table ID | table ID extension | version number | section number |
|---|---|---|---|---|
| section | 01h | 2345h | 06h | 00h |

The comparison result storage circuit 961–964 in the header match detecting circuit 85 are initialized to "match" before a section is input.

Initially, "01h" as a first field is input. The data position counter 92 outputs an address "0", and a first parameter A and a first parameter A mask are selected. The comparison result of the data comparison circuit 94 is "match", and "match" is stored in the first comparison result storage circuit 961, and therefore the comparison result decision circuit 95 stores "match" in the first storage circuit 961.

Subsequently, the data position counter 92 outputs an address "1", and a second parameter A and a second parameter A mask in the memory are selected. The comparison result of the data comparison circuit 94 is "match", and "match" is stored in the second comparison result storage circuit 962, and therefore the comparison result decision circuit 95 stores "match" in the second storage circuit 962.

Then, the data position counter 92 outputs an address "2". A third parameter A is "mismatch" and a fourth parameter A is "mismatch", and therefore, "mismatch" is stored in the third and fourth storage circuits 963 and 964.

The following fields as input data are processed in the same manner. As a result of processing the last field, "match" is stored in the storage circuit 961.

Thus, when the section which has the above header, "match" between the data and the parameter is detected only by the first comparison result storage circuit 961. Since the "match" has been detected by at least one header match detecting circuit, the input section is selected and output. The other input sections as described in the first embodiment are processed and output in the same manner.

Thus, in accordance with the section data selecting circuit of the fourth embodiment, plural header match detecting circuits in the section data selecting circuit of the first embodiment is replaced by one header match detecting circuit. Therefore, the section data selecting circuit which is capable of setting selecting conditions flexibly, setting plural sections to be subjected to selecting process, and reliably selecting and outputting the necessary, is realized on a smaller scale.

While in the fourth embodiment four parameters are used the present invention is not restricted thereto. In accordance with the present invention, processing speed is the same irrespective of the number of types of parameters, and data is subjected to selecting process in real time.

In addition, plural header match detecting circuits of the fourth embodiment may be provided as in the case of the first embodiment.

Further, while in the fourth embodiment the parameter storage circuit and the parameter mask storage circuit are implemented by the memory, they may be implemented by the parameter storage circuit and the parameter mask storage circuit shown in FIG. 4, as described in the first embodiment, respectively.

Embodiment 5

Figure 10:
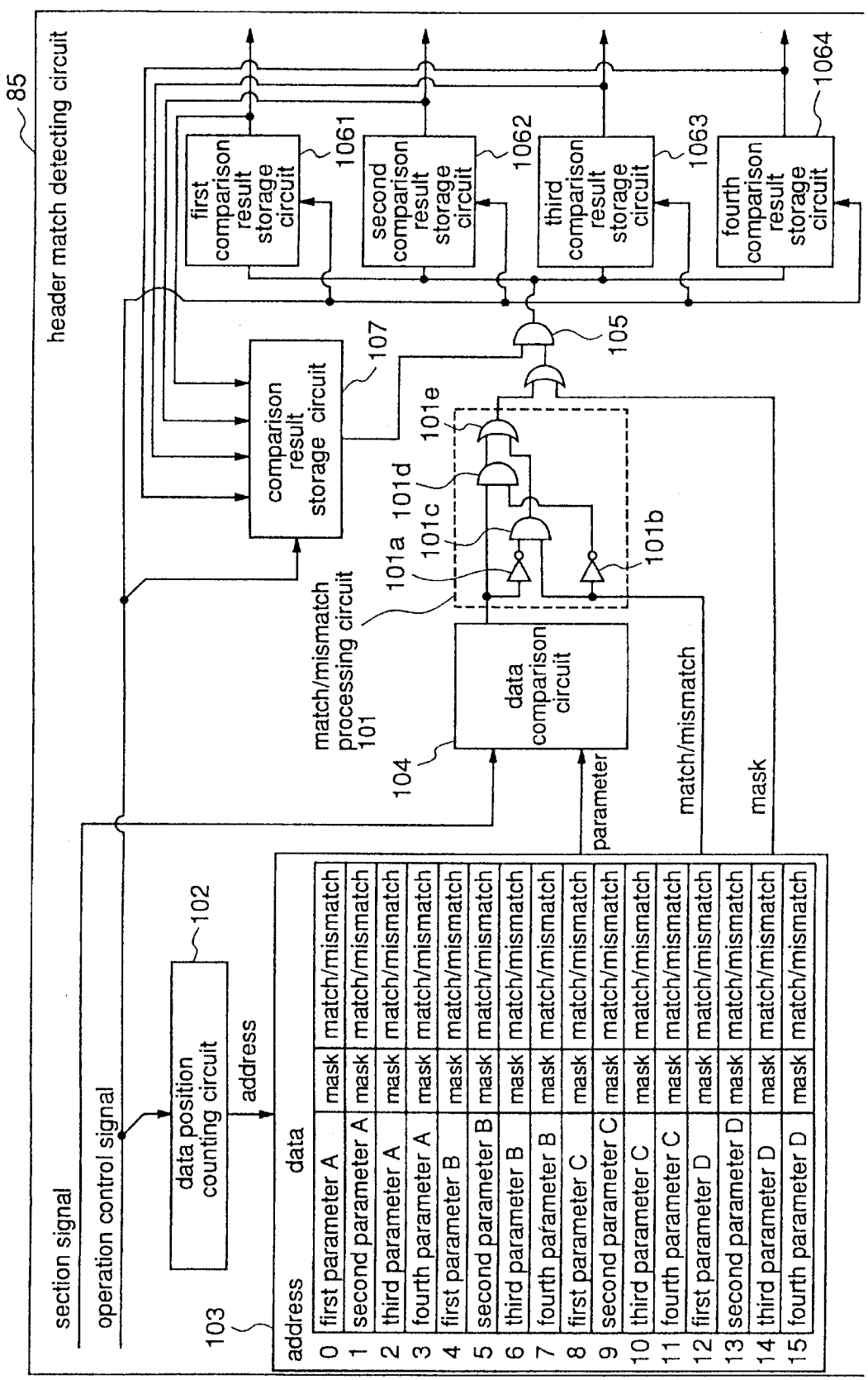
FIG. 10 is a diagram showing a header match detecting circuit of a fifth embodiment of the present invention.

FIG. 10 shows a header match detecting circuit according to a fifth embodiment of the present invention. In FIG. 10, the same reference numerals as in FIG. 9 designate the same or corresponding parts.

The header match detecting circuit of the fifth embodiment differs from that of the fourth embodiment in that it includes a match/mismatch processing circuit 101, and each parameter entry in a memory 103 has a storage area in which data "match/mismatch" check between input data and a parameter is set.

The match/mismatch processing circuit 101 includes two NOT circuits 101*a* and 101*b*, two AND circuits 101*c* and 101*d*, and an OR circuit 101*e* as in the case of the match/mismatch processing circuit 61 of the second embodiment. The circuit 101 operates as follows.

In a case where "match check" between a section signal as input data and a parameter in the memory 103 is performed, "match" is set in a "match/mismatch" setting area in the memory 63. Through this setting, the output of the data comparison circuit 104 becomes the output of the match/mismatch processing circuit 101. The circuit operates as conventional.

In another case where "mismatch check" between a section signal as input data and a parameter in the memory 103 is performed, "mismatch" is set in a "match/mismatch" setting area in the memory 103. Through this setting, when "match" is output from the data comparison circuit 104, "mismatch" is output from the match/mismatch processing circuit 101. On the other hand, when "mismatch" is output from the data comparison circuit 104, "match" is output from the match/mismatch processing circuit 101. In other words, "mismatch" is checked.

This operation will be described in more detail. Assume that a candidate shown in the following table 19 is subjected to selecting process.

TABLE 19

| | table ID | table ID extension | version number | section number |
|---|---|---|---|---|
| section | 01h | other than 234h | 05h | 00h |
| section | 04h | 203h | arbitrary | 00h |
| section | 02h | 100h | arbitrary | 00h |
| section | 07h | 125h | arbitrary | 00h |

In this case, the first to fourth parameters and parameter masks are set in the memory 103 as shown in the following table 20.

TABLE 20

| | |
|---|---|
| first parameter A (table ID) | 01h |
| first parameter B (table ID extension) | 234h |
| first parameter C (version number) | 05h |
| first parameter D (section number) | 00h |
| first parameter A mask | match detection necessary |
| first parameter B mask | match detection necessary |
| first parameter C mask | match detection necessary |
| first parameter D mask | match detection necessary |
| first parameter A match/mismatch | match |
| first parameter B match/mismatch | mismatch |
| first parameter C match/mismatch | match |
| first parameter D match/mismatch | match |
| second parameter A (table ID) | 04h |
| second parameter B (table ID extension) | 203h |
| second parameter C (version number) | arbitrary |
| second parameter D (section number) | 00h |
| second parameter A mask | match detection necessary |
| second parameter B mask | match detection necessary |
| second parameter C mask | match detection unnecessary |
| second parameter D mask | match detection necessary |
| second parameter A match/mismatch | match |
| second parameter B match/mismatch | match |
| second parameter C match/mismatch | match |
| second parameter D match/mismatch | match |
| third parameter A (table ID) | 02h |
| third parameter B (table ID extension) | 100h |
| third parameter C (version number) | arbitrary |
| third parameter D (section number) | 00h |
| third parameter A mask | match detection necessary |
| third parameter B mask | match detection necessary |
| third parameter C mask | match detection unnecessary |
| third parameter D mask | match detection necessary |
| third parameter A match/mismatch | match |
| third parameter B match/mismatch | match |
| third parameter C match/mismatch | match |
| third parameter D match/mismatch | match |
| fourth parameter A (table ID) | 07h |
| fourth parameter B (table ID extension) | 125h |
| fourth parameter C (version number) | arbitrary |
| fourth parameter D (section number) | 00h |
| fourth parameter A mask | match detection necessary |
| fourth parameter B mask | match detection necessary |
| fourth parameter C mask | match detection unnecessary |
| fourth parameter D mask | match detection necessary |
| fourth parameter A match/mismatch | match |
| fourth parameter B match/mismatch | match |
| fourth parameter C match/mismatch | match |
| fourth parameter D match/mismatch | match |

Here it is assumed that a section shown in the following table 21 is input.

TABLE 21

| | table ID | table ID extension | version number | section number |
|---|---|---|---|---|
| section | 01h | 200h | 05h | 00h |

Comparison result storage circuits 1061–1064 are initialized to "match" before a section is input.

Initially, "01h" as a first field is input. A data position counter 102 outputs an address "0", and a first parameter A, a first parameter A mask, and first parameter A match/mismatch in the memory 103 are selected.

The comparison result of the data comparison circuit 104 is "match", and "match" is stored in the first comparison result storage circuit 1061, and therefore the comparison result decision circuit 105 stores "match" in the first storage circuit 1061.

In a case where the value of the data position counter 102 is "1", "2", or "3", a second parameter A group, a third parameter A group, or a fourth parameter A group is selected, respectively. In any case, the result of the data comparison circuit 104 is "mismatch", and therefore "mismatch" is stored in the second to fourth comparison result storage circuits 1062–1064.

When "200h" as a second field is input, the value of the data position counter 102 is "4", and a first parameter B, a first parameter mask B, and first parameter B match/mismatch are selected. In this case, since the "mismatch" is indicated, and the set value of the first parameter B 234h≠200h, the output of the match/mismatch processing circuit 101 is "match", and "match" is stored in the first comparison result storage circuit 1061, so that the comparison result decision circuit 105 stores "match" in the first comparison result storage circuit 1061.

Thereafter, the same operation is performed, and the input section is selected according to the first parameter group set in the memory 103.

Thus, in accordance with the fifth embodiment, the header match detecting circuit of the fourth embodiment includes the match/mismatch processing circuit 101 and the storage area in each parameter entry of the memory 103 which sets data "match check" between the input data and the parameter or data "mismatch check" between them. As a result, the "mismatch check" as well as "match check" can be performed. Consequently, it is possible to obtain a section data selecting circuit which is capable of selecting all the data other than data which satisfies a condition set in a parameter on a smaller scale as in the case of the second embodiment.

While in the fifth embodiment the parameter storage circuit and the parameter mask storage circuit are implemented by the memory, they may be implemented by the parameter storage circuit and the parameter mask storage circuit shown in FIG. 4, as described in the first embodiment, respectively.

Embodiment 6

Figure 11:
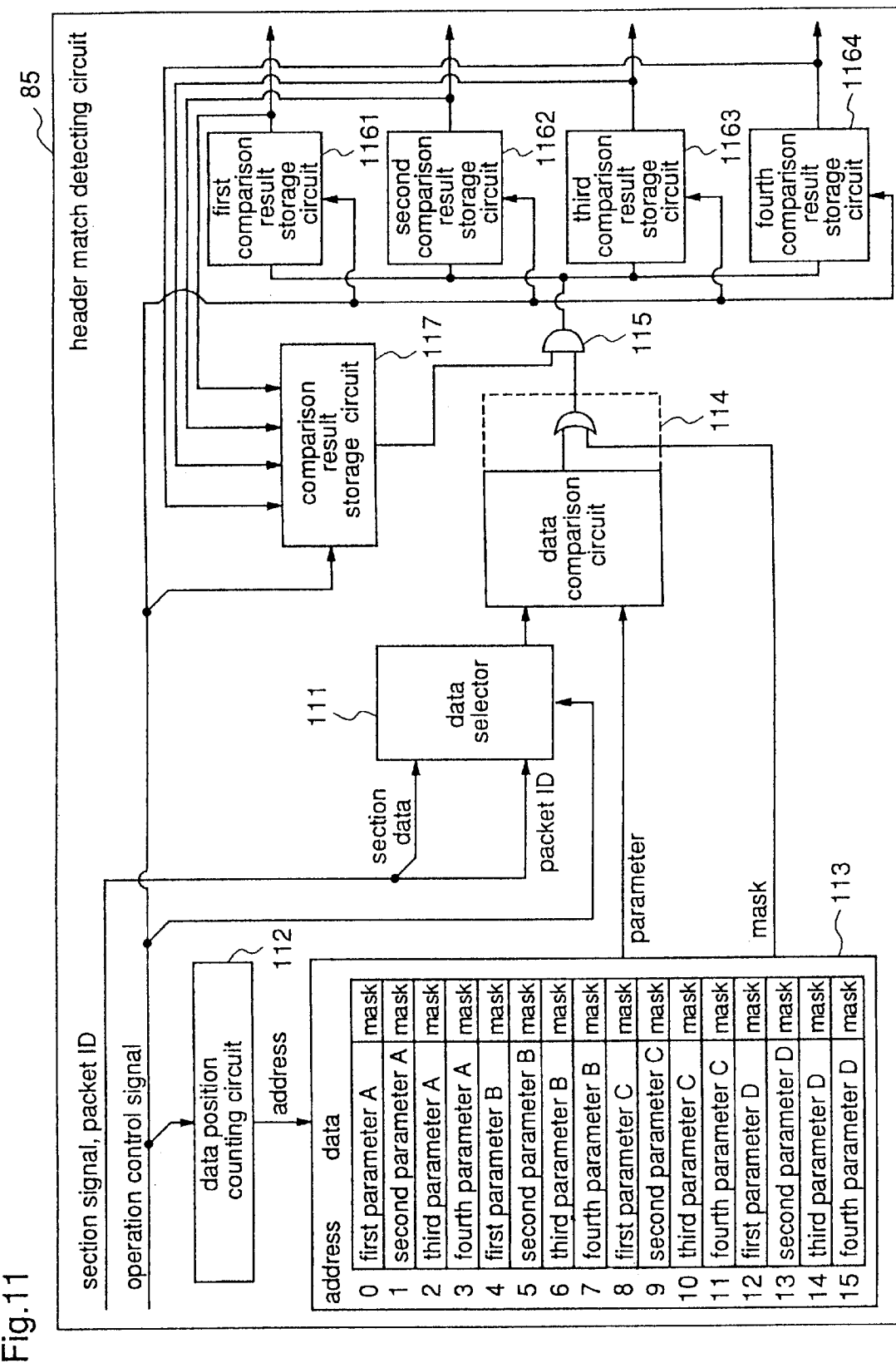
FIG. 11 is a diagram showing a header match detecting circuit of a sixth embodiment of the present invention.

FIG. 11 shows a header match detecting circuit according to a sixth embodiment of the present invention. In FIG. 11, the same reference numerals as in FIG. 9 designate the same or corresponding parts. The header match detecting circuit of the sixth embodiment differs from that of the fourth embodiment in that it is provided with a data selector 111 which receives a control signal and controls a timing at which switching of data to be subjected to comparison process by the data comparison circuit 114 is performed. This is similar to the data selector 71 of the third embodiment.

The operation is described in more detail. Assume that a candidate in the following table 22 is subjected to selecting process.

TABLE 22

| | table ID | table length | table ID extension | version number | (packet ID) |
|---|---|---|---|---|---|
| 1st section | 01h | arbitrary | 06h | 00h | 07h |
| 2nd section | 01h | arbitrary | 04h | arbitrary | 05h |
| 3rd section | 03h | arbitrary | 00h | 00h | 03h |
| 4th section | 03h | arbitrary | 00h | 01h | 08h |

From this table, all the "section length" indicate "arbitrary". The section length represents the size of section data, and has nothing to do with types of the data in the section. Therefore, it is not necessary to use the section length for performing section selecting process to.

In some cases, it is necessary to perform selecting process to sections according to a packet ID of a transport stream packet which contains the sections, in addition to checking fields of the section. In such cases, conventionally, selection according to the packet ID is performed by software to the sections which have been subjected to selecting process by the section data selecting circuit. In this sixth embodiment, this is performed by using timing of the "section length" which is not used for performing section selecting process.

In this case, the first to fourth parameters and parameter masks are set in the memory 113 as shown in the following table 23.

TABLE 23

| | |
|---|---|
| first parameter A (table ID) | 01h |
| first parameter B (packet ID) | 07h |
| first parameter C (table ID extension) | 06h |
| first parameter D (section number) | 00h |
| first parameter A mask | match detection necessary |
| first parameter B mask | match detection necessary |
| first parameter C mask | match detection necessary |
| first parameter D mask | match detection necessary |
| second parameter A (table ID) | 01h |
| second parameter B (packet ID) | 05h |
| second parameter C (table ID extension) | 04h |
| second parameter D (version number) | arbitrary |
| second parameter A mask | match detection necessary |
| second parameter B mask | match detection necessary |
| second parameter C mask | match detection necessary |
| second parameter D mask | match detection unnecessary |
| third parameter A (table ID) | 03h |
| third parameter B (packet ID) | 03h |
| third parameter C (table ID extension) | 00h |
| third parameter D (version number) | 00h |
| third parameter A mask | match detection necessary |
| third parameter B mask | match detection necessary |
| third parameter C mask | match detection necessary |
| third parameter D mask | match detection necessary |
| fourth parameter A (table ID) | 03h |
| fourth parameter B (packet ID) | 08h |
| fourth parameter C (table ID extension) | 00h |
| fourth parameter D (version number) | 01h |
| fourth parameter A mask | match detection necessary |
| fourth parameter B mask | match detection necessary |
| fourth parameter C mask | match detection necessary |
| fourth parameter D mask | match detection necessary |

Here it is assumed that a section shown in the following table 24 is input.

TABLE 24

| | table ID | table length | table ID extension | version number | (packet ID) |
|---|---|---|---|---|---|
| section | 01h | arbitrary | 06h | 00h | 07h |

First to fourth comparison result storage circuits 1161–1164 are initialized to "match" before a section is input.

Initially, "01h" as a first field is input. A data position counter 112 outputs an address "0", and a first parameter A and a first parameter A mask in the memory 113 are selected. The comparison result of the data comparison circuit 114 is "match", and "match" is stored in the first comparison result storage circuit 1161, and therefore the comparison result decision circuit 115 stores "match" in the storage circuit 1161.

Subsequently, the data position counter 112 outputs an address "1", and a second parameter A and a second parameter A mask in the memory 113 are selected. The comparison result of the data comparison circuit 114 is "match", and "match" is stored in the second comparison result storage circuit 1162, and therefore the comparison result decision circuit 115 stores "match" in the storage circuit 1162.

Then, the data position counter 112 outputs an address "2", and a third parameter A and a third parameter A mask in the memory 113 are selected. The comparison result of the data comparison circuit 114 is "mismatch", and the comparison result decision circuit 115 stores "mismatch" in the storage circuit 1163.

Then, the data position counter 112 outputs an address "3", and a fourth parameter A and a fourth parameter A mask in the memory 113 are selected. The comparison result of the data comparison circuit 114 is "mismatch", and the comparison result decision circuit 115 stores "mismatch" in the storage circuit 1162.

Then, the data position counter 112 outputs an address "4" and a first parameter B and a first parameter B mask in the memory 113 are selected.

In this case, data for comparison is not section data but a packet ID, and therefore the data selector 111 selects the packet ID in accordance with the control signal and inputs it to the data comparison circuit 114.

The comparison result of the data comparison circuit 114 is "match", and "match" is stored in the first comparison result storage circuit 1161, so that the comparison result decision circuit 115 stores "match" in the first storage circuit 1161.

Thereafter, the same operation is performed.

For creation of the control signal of the data selector 111, an operation control circuit 34 is provided with a counter. A counter's value is initialized every time a section is input, and counted up every time a field is input.

In a case where the counter's value is one of those shown in the following table 25, the data selector 111 selects the packet ID when it is "1".

TABLE 25

| | table ID | table ID extension | version number | section number |
|---|---|---|---|---|
| Counter's value | 0 | 1 | 2 | 3 |

Alternatively, this is also implemented by the use of the data position counter 112. In this embodiment, the value of the data position counter 112 is divided by 4, and when the remainder matches a preset vale, the data selector 111 is controlled so as to select the packet ID.

Thus, in accordance with the sixth embodiment, the header match detecting circuit of the fourth embodiment is provided with the data selector 111 for performing switching of target data for comparison. Therefore, as in the case of the third embodiment, comparison is made between "data which characterizes data comprising plural fields" such as the packet ID and the parameter, by using timing of a field which is not compared to a parameter. The section data selecting circuit which does not require another processing time for this comparison is realized on a smaller scale.

While in the sixth embodiment, the description has been given of the case where comparison is made between one "data which characterizes data comprising plural fields" such as the packet ID and the parameter, the data selector may have multiple inputs to make comparison between plural pieces of "data which characterizes data comprising plural fields" such as the packet IDs and the parameters.

Besides, while in the sixth embodiment the parameter storage circuit and the parameter mask storage circuit are implemented by the memory, they may be implemented by the parameter storage circuit and the parameter mask storage circuit shown in FIG. 4 as described in the first embodiment, respectively.

Moreover, in the first to sixth embodiments, the description has been given of the circuit which performs selecting process to section data according to MPEG in the digital broadcasting receiver. Alternatively, the data match detecting circuit of the present invention is applicable to selection of data having another format so long as the data comprises plural fields.

What is claimed is:

1. A data match detecting apparatus which sequentially receives input data comprising plural fields, comprising:

parameter storage means which contains a parameter group comprising plural parameters which are checked to detect match between the plural fields and the plural parameters;

parameter selecting means for selecting a parameter corresponding to a field input as the input data from parameters in the parameter storage means and outputting the selected parameter;

data comparison means for checking match between the parameter output from the parameter selecting means and the input data;

comparison result storage means; and comparison result decision means;

the comparison result storage means initializing its storage content to "match" before a first field of the input data for which match detection should be performed is input, storing a comparison result of the comparison result decision means when there has been an input field, and outputting its storage content when all the fields of the input data for which match detection should be performed have been input; and the comparison result decision means storing "match" in the comparison result storage means when the storage content of the comparison result storage means and the comparison result of the data comparison means are "match".

2. The data match detecting apparatus as defined in claim 1 further comprising:

parameter mask storage means for storing parameter masks for plural parameters stored in the parameter storage means, each indicating whether or not data match detection for the corresponding parameter is necessary; and parameter mask selecting means for selecting a parameter mask for a field input as the input data from parameter masks in the parameter mask storage means and outputting the selected parameter mask;

the data comparison means receiving the parameter mask output from the parameter mask selecting means as an input, and deciding that there is "match" when the parameter mask indicates that data match detection is not necessary, in either case where the input field matches or does not match the parameter.

3. The data match detecting apparatus as defined in claim 1 further comprising:

check type storage means which contains one of data match check and data mismatch check for each of plural parameters stored in the parameter storage means; and check type selecting means for selecting a check type of the input field as the input data from check types in the check type storage means and outputting the selected type;

the data comparison means receiving the check type output from the check type selecting means as an input, deciding there is "match" when the check type indicates "match check" and there is "match" between the parameter and the field, and deciding there is "match" when the check type indicates "mismatch check" and there is mismatch between the parameter and the field.

4. The data match detecting apparatus as defined in claim 1 further comprising:

data selecting means for receiving data comprising plural fields and plural pieces of "data which characterizes data comprising the plural fields" as inputs, and selecting data to be subjected to comparison process and outputting the selected data;

the output of the data selecting means being used as the input data to the data comparison means, thereby performing switching of data to be subjected to comparison process by the data comparison means.

5. A data match detecting apparatus comprising:

a plurality of data match detecting apparatuses as defined in claim 1, wherein the parameter storage means contains plural types of parameter groups; and match decision means for deciding there is "match" when at least one of the comparison result storage means of the plural data match detecting apparatuses outputs "match".

6. A data match detecting apparatus which sequentially receives input data comprising plural fields, comprising:

parameter storage means which contains at least two parameter groups each comprising plural parameters which are checked to detect match between the plural fields and the plural parameters;

parameter selecting means for selecting parameters corresponding to fields input as the input data from parameters in the parameter storage means and sequentially outputting the selected parameters for each parameter group;

data comparison means for checking match between the parameter output from the parameter selecting means and the input data;

plural comparison result storage means provided for the plural parameter groups, each initializing its content to match before a first field of the input data for which match detection should be performed, each storing a comparison result of the comparison result decision means when there has been an input field, and each outputting its storage content when all the fields of the input data for which match detection should be performed have been input;

comparison result selecting means for selecting a comparison result for a parameter group to which parameters input to the data comparison means belong, from outputs of the plural comparison result storage means; and comparison result decision means for storing "match" in the comparison result storage means for the parameter group being subjected to comparison process when the output of the comparison result selecting means and the comparison result of the data comparison means are "match".

7. The data match detecting apparatus as defined in claim 6 further comprising:

parameter mask storage means which contains parameter masks for respective parameters in plural parameter groups stored in the parameter storage means, each indicating whether or not data match detection for the corresponding parameter is necessary; and parameter mask selecting means for selecting a parameter mask for the parameter selected by the parameter selecting means from parameter masks stored in the parameter storage means and outputting the selected parameter mask;

the data comparison means receiving the parameter mask output from the parameter mask selecting means as an input, and deciding that there is "match" when the parameter mask indicates that data match detection is not necessary, in either case where the input field matches or does not match the parameter.

8. The data match detecting apparatus as defined in claim 6 further comprising:

check type storage means which contains one of data match check and data mismatch check for each of parameters in plural parameter groups stored in the parameter storage means; and check type selecting means for selecting a check type of the input field as the input data from check types in the check type storage means and outputting the selected type;

the data comparison means receiving the check type output from the check type selecting means as an input, deciding there is "match" when the check type indicates "match check" and there is match between the parameter and the field, and deciding there is "match" when the check type indicates "mismatch check" and there is mismatch between the parameter and the field.

9. The data match detecting apparatus as defined in claim 6 further comprising:

data selecting means for receiving data comprising plural fields and plural pieces of "data which characterizes data comprising the plural fields" as inputs, and selecting data to be subjected to comparison process and outputting the selected data;

the output of the data selecting means being used as the input data to the data selecting means, thereby performing switching of data to be subjected to comparison process by the data comparison means.

10. A data match detecting apparatus comprising:

the data match detecting apparatus as defined in claim 6, wherein the parameter storage means contains plural types of parameter groups; and match decision means for deciding there is "match" when at least one of comparison result output means of the plural data match detecting apparatuses outputs "match".

11. A data selecting apparatus comprising:

the data match detecting apparatus as defined in claim 1;

data delay means for delaying input data until it has been decided whether or not respective fields of the input data match the corresponding parameters in the data match detecting apparatus; and output control means for outputting delayed data output from the data delay means as selection result data when the data match detecting apparatus outputs "match".

* * * * *